United States Patent
Jayaraman et al.

(10) Patent No.: US 8,946,931 B2
(45) Date of Patent: Feb. 3, 2015

(54) DUAL BOOST CONVERTER FOR UPS SYSTEM

(75) Inventors: Chandrasekaran Jayaraman, Bangalore (IN); Indra Prakash, Bangalore (IN); Damir Klikic, Waltham, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 783 days.

(21) Appl. No.: 13/192,876

(22) Filed: Jul. 28, 2011

(65) Prior Publication Data

US 2013/0027126 A1 Jan. 31, 2013

(51) Int. Cl.
- *H02J 9/00* (2006.01)
- *H02J 3/00* (2006.01)
- *H02J 7/00* (2006.01)
- *H02M 3/158* (2006.01)
- *H02J 9/06* (2006.01)

(52) U.S. Cl.
CPC ............... *H02M 3/158* (2013.01); *H02J 9/062* (2013.01); *H02J 2009/063* (2013.01)
USPC .................................. 307/64; 307/66; 307/82

(58) Field of Classification Search
USPC ................................................ 307/64, 66, 82
See application file for complete search history.

(56) References Cited

U.S. PATENT DOCUMENTS

| | | | |
|---|---|---|---|
| 4,823,247 A | 4/1989 | Tamoto | |
| 6,661,678 B2 | 12/2003 | Raddi et al. | |
| 7,075,193 B2 * | 7/2006 | Yang et al. | ...................... 307/66 |
| 7,402,921 B2 | 7/2008 | Ingemi et al. | |
| 7,652,393 B2 | 1/2010 | Moth | |
| 7,705,489 B2 | 4/2010 | Nielsen et al. | |
| 2006/0238941 A1 | 10/2006 | Ingemi et al. | |
| 2012/0175958 A1 | 7/2012 | Dighrasker et al. | |

OTHER PUBLICATIONS

Notification of Transmittal of the International Search Report and the Written Opinion of the International Searching Authority from corresponding PCT/US2012/048343 mailed Jun. 3, 2013.

* cited by examiner

*Primary Examiner* — Hal Kaplan
(74) *Attorney, Agent, or Firm* — Lando & Anastasi, LLP

(57) ABSTRACT

A power converter includes a power conversion circuit switchably coupled to a first power input and a second power input. The power conversion circuit is operable to generate positive and negative DC output voltages and is configured such that, in a backup mode of operation, the negative DC output voltage is generated using backup power through a first current path of the power conversion circuit that includes a first diode coupled between the second power input and a second DC bus, and, in a line mode of operation, the negative DC output voltage is generated using AC input power through a second current path of the power conversion circuit that bypasses the first diode and includes a second diode coupled between the first power input and the second DC bus.

20 Claims, 8 Drawing Sheets

DUAL BOOST CONVERTER FOR UPS SYSTEM

BACKGROUND OF THE INVENTION

1. Field of Invention

Embodiments of the invention relate generally to power conversion, and more particularly, to generating an output voltage from an input voltage in an uninterruptible power supply.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security and data center management systems may also be powered by a UPS. A UPS designed for data center or industrial use may provide backup power for loads of between 1 and 20 kVA for several hours.

A UPS unit typically includes one or more batteries as a power source when AC mains power is unavailable. DC power provided by the battery is converted to AC power by a power converter circuit, which in turn is provided to the load. A battery charger, which converts AC power to DC power, may be included in the UPS to charge the battery when AC mains is available to ensure that backup power will be available when needed. The UPS may also include a control unit for automatically managing the operation of the UPS and the power conversion functions.

BRIEF SUMMARY OF THE INVENTION

According to one embodiment, a power converter includes a first power input to receive AC input power, a second power input to receive backup power, a first DC bus configured to provide a positive DC output voltage, a second DC bus configured to provide a negative DC output voltage, and a power conversion circuit switchably coupled to the first power input and the second power input. The power conversion circuit is operable to generate the positive and negative DC output voltages, and configured such that, in a backup mode of operation, the negative DC output voltage is generated using the backup power through a first current path of the power conversion circuit and, in a line mode of operation, the negative DC output voltage is generated using the AC input power through a second current path of the power conversion circuit. The first current path includes a first diode coupled between the second power input and the second DC bus. The second current path bypasses the first diode and includes a second diode coupled between the first power input and the second DC bus.

In another embodiment, the first diode has a first cathode and a first anode, and the second diode has a second cathode. The power conversion circuit may include an inductive element and a switch having a pole, a first contact and a second contact. The pole of the switch may be coupled to the inductive element. The first contact may be coupled to the first cathode of the first diode, and the second contact may be coupled to the first anode of the first diode and the second cathode of the second diode. The switch may be configured to form a portion of the first circuit when the first contact is closed, and a portion of the second circuit when the second contact is closed. In one embodiment, the first diode may be rated at approximately 600V, and the second diode may be rated at approximately 600V.

In another embodiment, the second diode may include a second anode coupled to the second DC bus.

In another embodiment, the second power input may be coupled to a battery.

In another embodiment, the battery includes a negative terminal. The power converter may include a connection circuit configured to switchably couple the inductive element to the first power input or the negative terminal of the battery. In another embodiment, the inductive element may be coupled in series between the connection circuit and the second diode. In another embodiment, the first diode may be coupled in parallel with the second diode.

In another embodiment, the power conversion circuit may be configured to be switchable between a first configuration and a second configuration. The first configuration of the power conversion circuit may include a boost converter circuit, and the second configuration of the power conversion circuit may include a buck-boost converter circuit.

According to one embodiment, a method of providing power to a load includes detecting a loss of input power from a primary power source. Responsive to detecting the loss of the input power and in a backup mode of operation, the method includes generating a negative DC output voltage using a backup power source through a first current path that includes a first diode coupled between the backup power source and a DC power bus. The method further includes detecting a presence of the input power from the primary power source. Responsive to detecting the presence of the input power and in a line mode of operation, the method includes generating the negative DC output voltage using the primary power source through a second current path that bypasses the first diode and includes a second diode coupled between the primary power source and the DC power bus.

In another embodiment, the method may include coupling, in the backup mode of operation, a first cathode of the first diode to an inductive element using a switch to create a portion of the first current path. The first current path may include the first diode, the second diode, and the inductive element such that the first diode is coupled in series between the inductive element and the second diode.

In another embodiment, the method may include decoupling, in the line mode of operation, the first cathode of the first diode from the inductive element using the switch and coupling a second cathode of the second diode to the inductive element using the switch to create a portion of the second current path that bypasses the first diode and includes the second diode and the inductive element.

In another embodiment, a first switching element may be coupled in series between the first cathode of the first diode and a battery, and a second switching element may be coupled to a first anode of the first diode and the second cathode of the second diode. The method may include energizing the first switching element a first amount of time subsequent to energizing the second switching element. In one embodiment, the first amount of time may be between approximately 0.5 microseconds and approximately 1.5 microseconds.

In another embodiment, the method may include deenergizing the first switching element a second amount of time prior to deenergizing the second switching element. In one embodiment, the second amount of time may be between approximately 0.5 microseconds and approximately 1.5 microseconds.

According to one embodiment, a power converter includes a first power input to receive AC input power, a second power input receive backup power, a power output to provide output power derived from at least one of the AC input power and the backup power, a first diode and a second diode, and means for providing a negative DC output voltage to the power output through the first diode and the second diode using the backup power in a backup mode of operation, and providing the negative DC output voltage to the power output through the second diode using the AC input power in a line mode of operation.

In another embodiment, the first diode and the second diode may each be coupled between the second power input and the power output in the backup mode of operation. The second diode may be coupled between the first power input and the power output in the line mode of operation. In one embodiment, the first diode may be bypassed in the line mode of operation.

In another embodiment, the power converter may be configured to be switchable between a first configuration and a second configuration. The first configuration may include a boost converter circuit and the second configuration may include a buck-boost converter circuit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
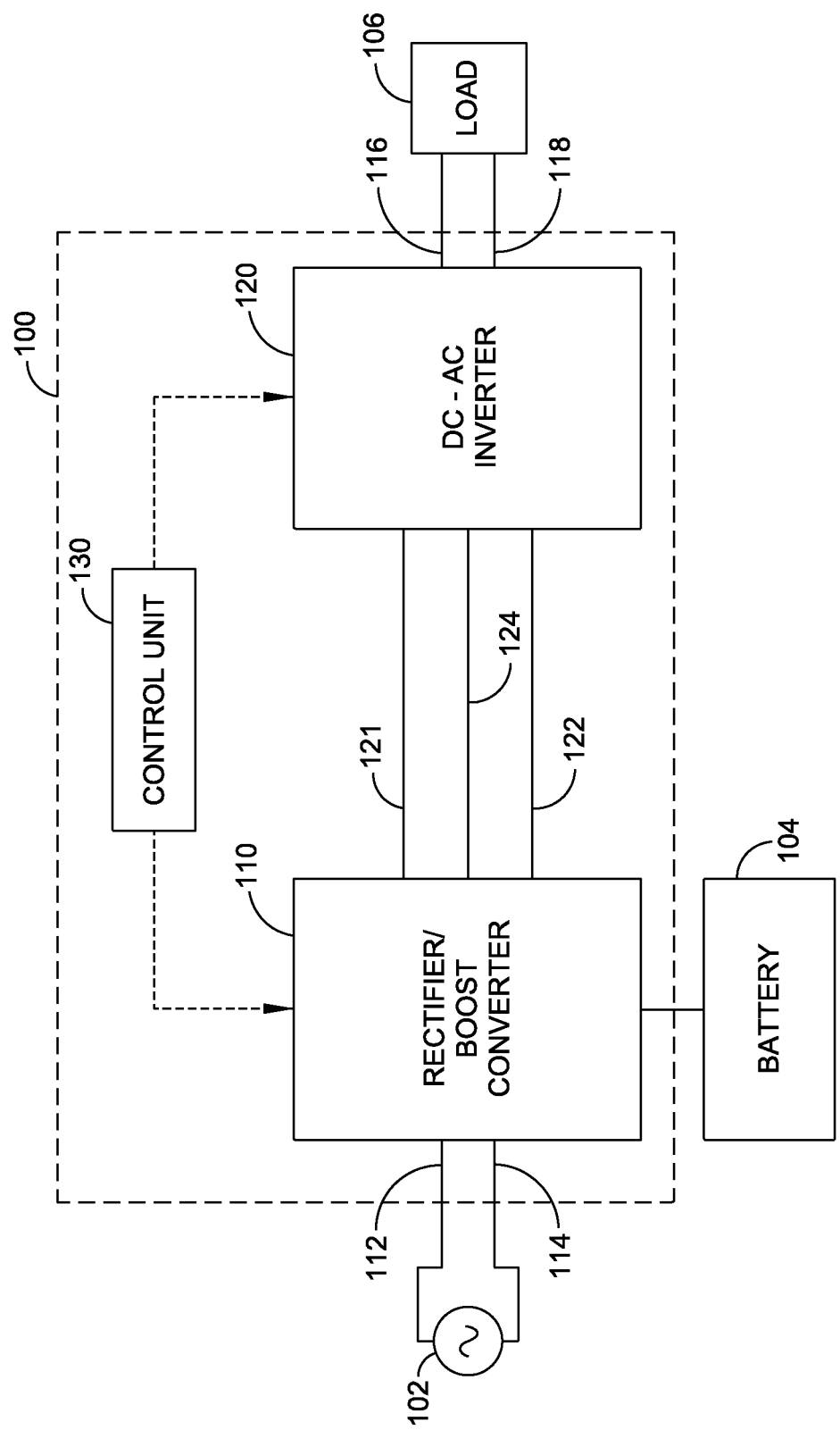
FIG. 1 is a functional block diagram of an uninterruptible power supply in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a block diagram of one embodiment of a UPS 100 that provides regulated power from an AC power source 102 as well as back-up power from a battery 104 to a load 106. The UPS 100 includes a rectifier/boost converter 110, an inverter 120, and a control unit 130 for controlling the rectifier/boost converter and the inverter. The UPS has inputs 112 and 114 that couple respectively to line (phase) and neutral of the AC power source 102, and outputs 116 and 118 to provide line and neutral, respectively, to the load 106.

In line mode of operation, under control of the control unit 130, the rectifier/boost converter 110 receives the input AC voltage and provides positive and negative DC voltages at lines 121 and 122 with respect to a common or neutral line 124. In backup mode of operation (also called battery mode of operation), upon loss of input AC power, the rectifier/boost converter 110 generates the DC voltages from the battery 104. The neutral line 124 may be coupled to the input neutral 114 and the output neutral 118 to provide a continuous neutral path through the UPS 100. The inverter 120 receives the DC voltages from the rectifier/boost converter 110 and provides an output AC voltage at lines 116 and 118.

Various techniques have been developed for power conversion in a UPS. In one technique, the UPS includes a front-end power factor correction (PFC) converter and a DC-AC inverter. One such implementation is described in U.S. Pat. No. 7,705,489 to Nielsen et al. To make neutral available to the load, some PFC converters are configured as dual boost converters. The Nielsen patent describes a UPS having a dual boost converter and a split DC bus (also called a dual DC bus).

Figure 2:
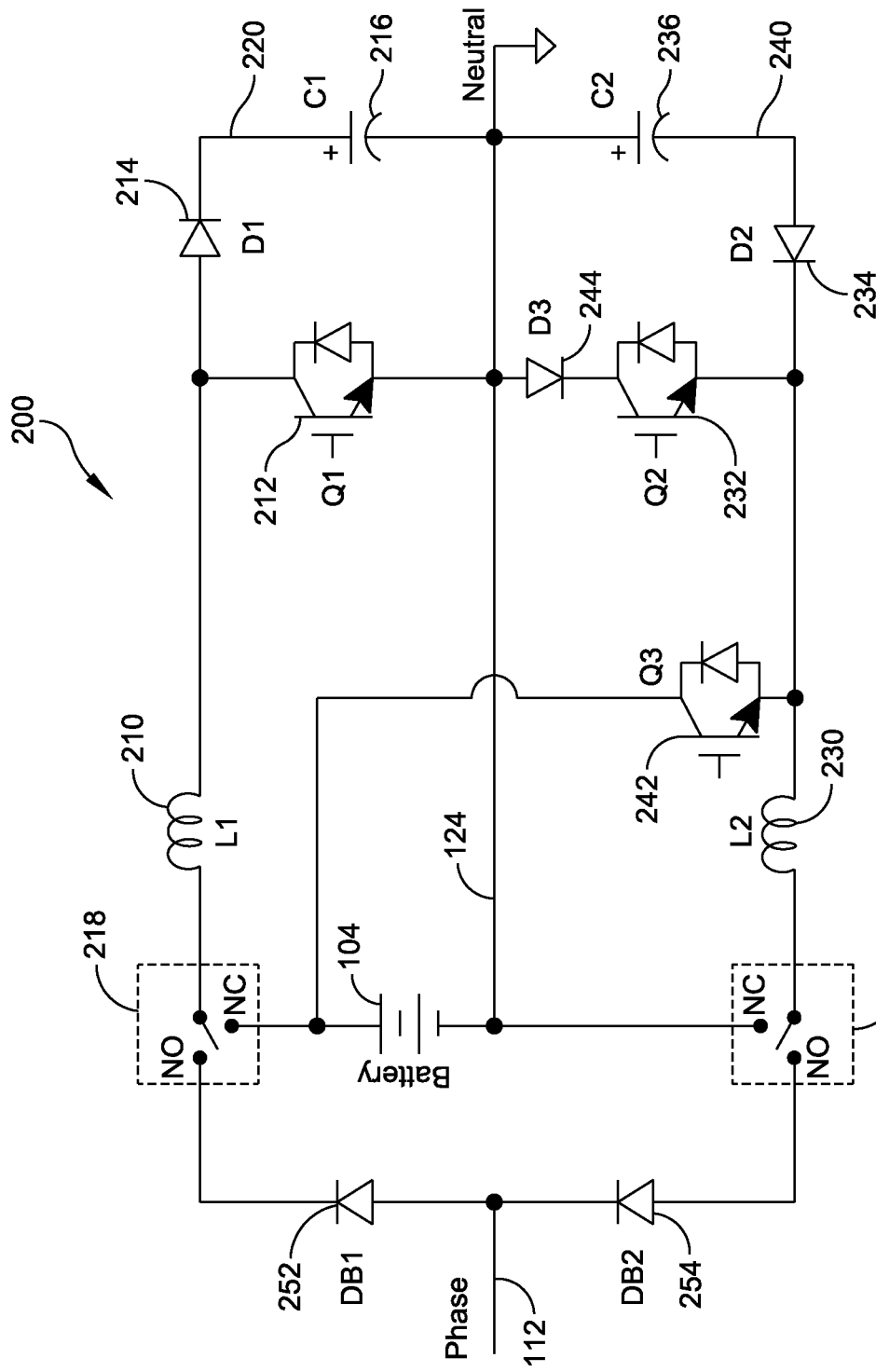
FIG. 2 is a schematic diagram of a conventional power conversion circuit.

FIG. 2 illustrates a typical UPS having a dual boost converter, which is generally indicated at 200. The dual boost converter 200 includes a positive-side boost converter and a negative-side boost converter.

The positive-side boost converter has a first inductor 210, a first switch 212, a first diode 214, and a first capacitor 216. The positive-side boost converter is switchably coupled to the external power source 102 (e.g., AC mains, not shown) through the phase input 112 and diode 252, or to the battery 104, through a first relay 218. It should be understood that any appropriate switch device may be used in place of the first relay 218 and other relays described herein. The first relay 218 is configured to switch the power feeding the positive-side boost converter between the external power source 102 and the battery 104. The positive-side boost converter is coupled to a first DC bus 220 and the neutral line 124. It should also be understood that a DC bus is not limited to a particular type of conductor and may include any suitable type of conductive element.

The negative-side boost converter has a second inductor 230, a second switch 232, a second diode 234, and a second capacitor 236. A third diode 244 is in series with the second switch 232 to prevent shorting of the battery 104 during backup mode operation, and functions as part of a buck-boost circuit in the backup mode of operation. The negative-side boost converter is switchably coupled to the external power source 102 (not shown) through diode 254, or to the battery 104, through a second relay 238. The second relay 238 is configured to switch the power feeding the negative-side boost converter between the external power source 102, via the phase input 112, and the battery 104. The negative-side boost converter is coupled to a second DC bus 240 and the neutral line 124.

In line mode of operation, the first relay 218 and the second relay 238 are each moved to the normally open (NO) position to couple the input AC line voltage at input 112 to inductors 210 and 230, such that positive and negative rectified voltages are respectively provided to inductors 210 and 230. Inductor 210 operates in conjunction with the first switch 212 and diode 214 as the positive-side boost converter, under the control of the controller 130 (not shown) using, for example, pulse width modulation to provide a positive DC voltage across capacitor 216. Similarly, inductor 230 operates in conjunction with the second switch 232 and diode 234 as a negative-side boost converter, also under the control of the controller 130, using, for example, pulse width modulation to provide a negative DC voltage across capacitor 236. The controller may control operation of the boost converters to provide power factor correction at the input of the uninterruptible power supply. The input currents are sinusoidal with low total harmonic distortion and are substantially in phase with the input voltage.

In backup mode of operation, the positive-side boost converter operates as a DC-DC boost converter, and the negative-side boost converter operates as a DC-DC buck-boost converter. Upon a failure of the AC voltage source 102 (not shown), the relays 218 and 238 are moved, under the control of the controller 130, to the normally closed (NC) positions to couple the battery 104 to inductors 210 and 230. The positive-side boost converter operates substantially as discussed above (that is, as a boost converter) using the battery voltage to generate the DC voltage across capacitor 216. To generate the negative voltage across the capacitor 236, a third switch 242, under the control of the controller 130 (not shown) and in conjunction with inductor 230 and diode 234, functions as a buck-boost circuit, with the third switch 242 being cycled off and on. In one example, during each cycle, the second switch 232 is turned on approximately 1.0 microseconds prior to the third switch 242 being turned on to reduce the voltage across the third switch 242 at the time of turn-on to approximately the battery voltage. The drive signal to the second switch 232 remains on for the duration of the on time of the third switch 242. There is no current flow in the second switch 232 because the emitter of the second switch 232 is at or near the battery voltage. When the third switch 242 is turned off, the second switch 232 is again forward biased, and consequently the current in the second inductor 230 flows through the third diode 244 and the second switch 232. The second switch 232 stays on for approximately 1.5 microseconds to allow the third switch 242 enough time to completely turn off, and then the second switch 232 is turned off.

In the topology shown in FIG. 2, the second diode 234 is a high voltage diode, such as a 900V or 1200V diode for a split DC bus of +/−400V, which is typical when the operating input voltage is as high as 275 VAC. The diode 234 is used in both line and backup modes. Due to the very high reverse recovery and high forward voltage drop of the second diode 234, the overall losses are very high and efficiency is limited, particularly in line mode of operation. Further, the switching transition speed of the second switch 232 and/or the third switch 242 must be slowed, also due to the very high reverse recovery characteristics of the second diode 234. Also, there are some forward conduction losses in the third diode 244.

The UPS described above allows a single battery to be used in a split DC bus rectifier converter circuit. Other known approaches utilize dual batteries or a split battery having a midpoint or third tap to generate the positive and negative bus voltages in backup mode of operation.

Figure 3:
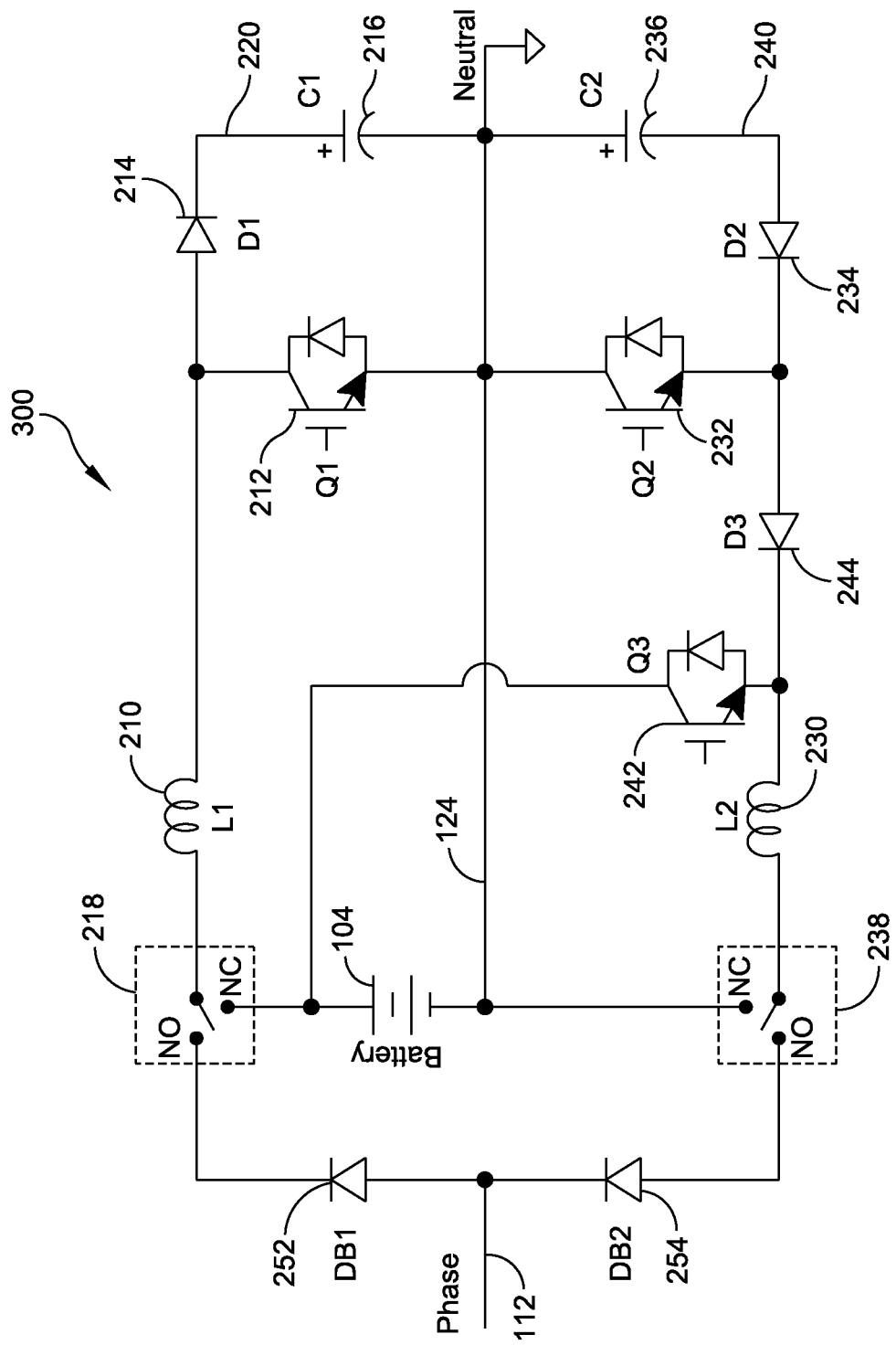
FIG. 3 is a schematic diagram of another conventional conversion circuit.

FIG. 3 illustrates another typical UPS having a dual boost converter, which is generally indicated at 300. The UPS 300 is substantially the same as the UPS 200 shown in FIG. 2, except that the third diode 244 is in series with the second diode 234 during backup mode of operation. In this topology, both the second diode 234 and the third diode 244 may have a lower voltage rating, for example, 600V each. This configuration overcomes the very high reverse recovery drawback of the topology of FIG. 2; however, in line mode of operation diode 244 carries a full inductor current, which reduces efficiency and poses thermal problems.

According to one embodiment of the invention, a UPS includes a power factor correction (PFC) circuit integrated with a buck-boost converter and a split DC bus. In line mode of operation, a primary power source, for example, AC mains power, provides power to the split DC bus as a first (e.g., positive) DC output voltage and a second (e.g., negative) DC output voltage with respect to a neutral line of the AC mains input. For example, during a positive portion of the AC mains input waveform (e.g., during the positive half-cycle of the input), the AC mains input may be converted into the first DC output voltage, and during a negative portion of the AC mains input waveform (e.g., during the negative half-cycle of the input), the AC mains input may be converted into the second DC output voltage.

In battery or backup mode of operation, battery power is provided to the split DC bus in place of the AC mains power, as first and second DC output voltages. For example, the battery power is converted into the first DC output voltage (e.g., a positive DC output voltage with respect to neutral) during a first portion of the power conversion cycle, and the battery power is converted into the second DC output voltage (e.g., a negative DC output voltage with respect to neutral) during a second portion of the power conversion cycle. The first and second portions of the power conversion cycle may be performed simultaneously from the battery to the split DC bus. The neutral of the AC mains and the return of the battery are common. A plurality of relays are used to switch the UPS between line mode operation and battery mode operation.

Figure 4A:
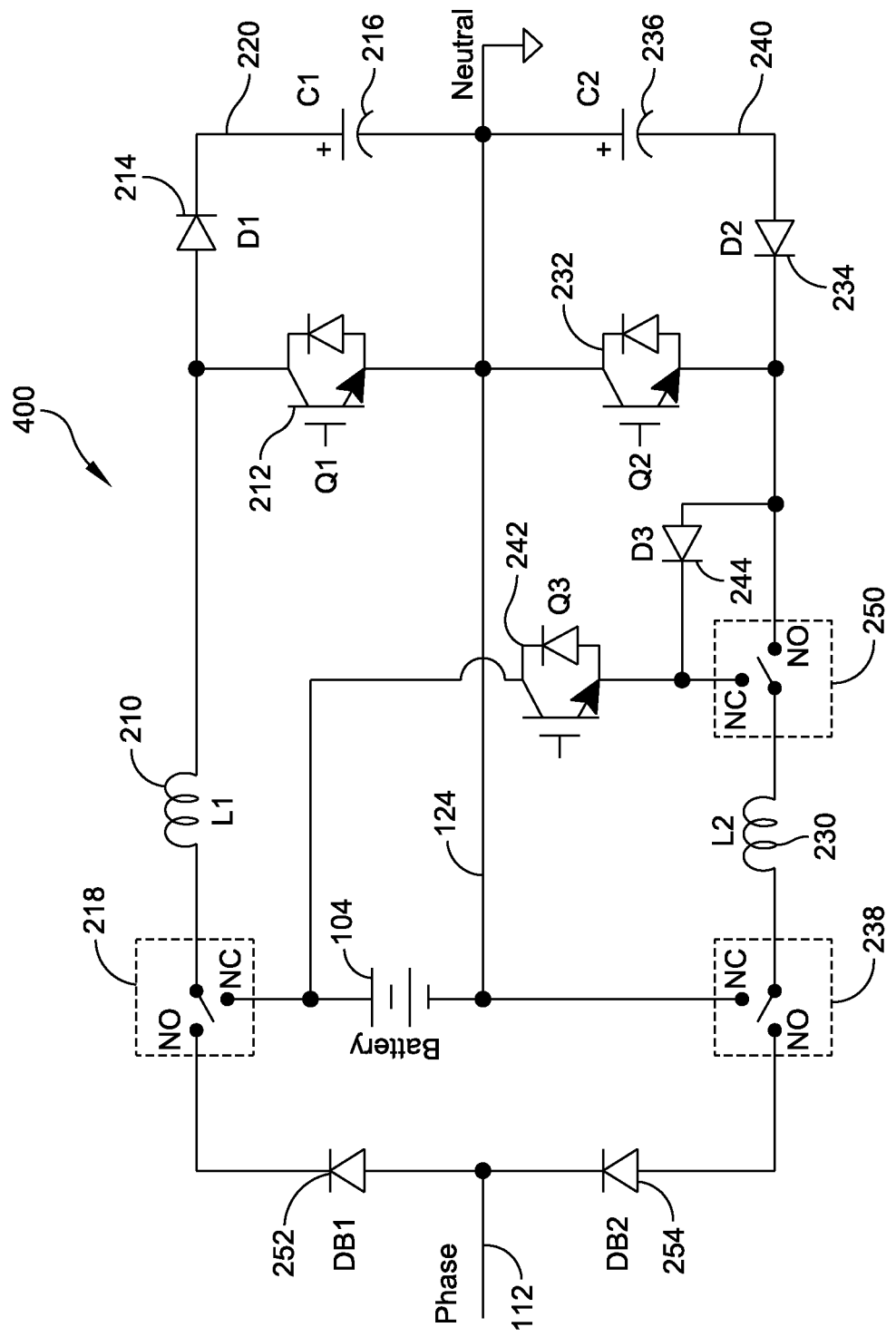
FIG. 4A is a schematic diagram of a power conversion circuit in accordance with one embodiment of the present invention.

FIG. 4A is a schematic diagram of a rectifier/boost circuit 400 according to one embodiment of the invention. The rectifier/boost circuit 400 may be used, for example, in a UPS such as shown in FIG. 1. The rectifier/boost circuit 400 shown in FIG. 4A is similar to the circuit 300 of FIG. 3, except that the rectifier/boost circuit 400 includes a third relay 250 that is coupled to the second inductor 230, the third diode 244, and the third switch 242. The third relay 250 may include, for example, a first contact, a second contact, a switching element that is movable between the first contact and the second contact, and a terminal or pole coupled to the movable switching element. Therefore, the third relay 250 may have at least three connection points: at the pole, the first contact and the second contact. The first switch 212, the second switch 232, and the third switch 242 may be implemented, for example, as transistors using FETs, IGBTs, MOSFETs, bipolar junction transistors, transistors with anti-parallel diodes, or other switching devices known to one of skill in the art.

In one embodiment, the terminal of the third relay 250 is coupled to the second inductor 230, the first contact of the third relay 250 is coupled to the cathode of the third diode 244, and the second contact of the third relay 250 is coupled to the anode of the third diode 244 as well as the cathode of the second diode 234. The third relay 250 is thus used to switch the third diode 244 in and out of the current path of the circuit, as will be described below.

According to one embodiment, the circuit 400 converts the AC mains input into first and second DC output voltages (e.g., positive and negative DC output voltages with respect to neutral) in a line mode of operation. In the line mode of operation, the circuit 400 is configured and/or operated as a boost converter for converting power during both the positive and negative half-cycles of the AC mains input. When the AC mains input is unavailable, a battery or other backup power source is used to provide power to the load. The circuit 400 converts power from the battery or other backup power source into the first and second DC output voltages during respective first and second portions of a backup power conversion cycle.

In battery mode of operation, the circuit 400 is configured and/or operated as a boost converter during the first portion of the power conversion cycle (e.g., a positive half-cycle), and the circuit 400 is configured as a buck-boost converter during the second portion of the power conversion cycle (e.g., a negative half-cycle). The first and second portions of the power conversion cycle may be performed simultaneously from the battery to the split DC bus. The topology of the negative-side of the converter includes the third relay 250, the second inductor 230, the second diode 234 and the third diode 244. In one embodiment, the second diode 234 and the third diode 244 are each rated at approximately 600V, although it should be understood that the second diode and the third diode may have different voltage ratings as will be appreciated by one of skill in the art. In battery mode, the second inductor 230, the second diode 234 and the third diode 244 are coupled in series through the third relay 250, which is switched to the NC position. In line mode, the second inductor 230 is coupled in series with the second diode 234, and the third diode 244 is bypassed by switching the third relay 250 to the NO position.

Figure 4B:
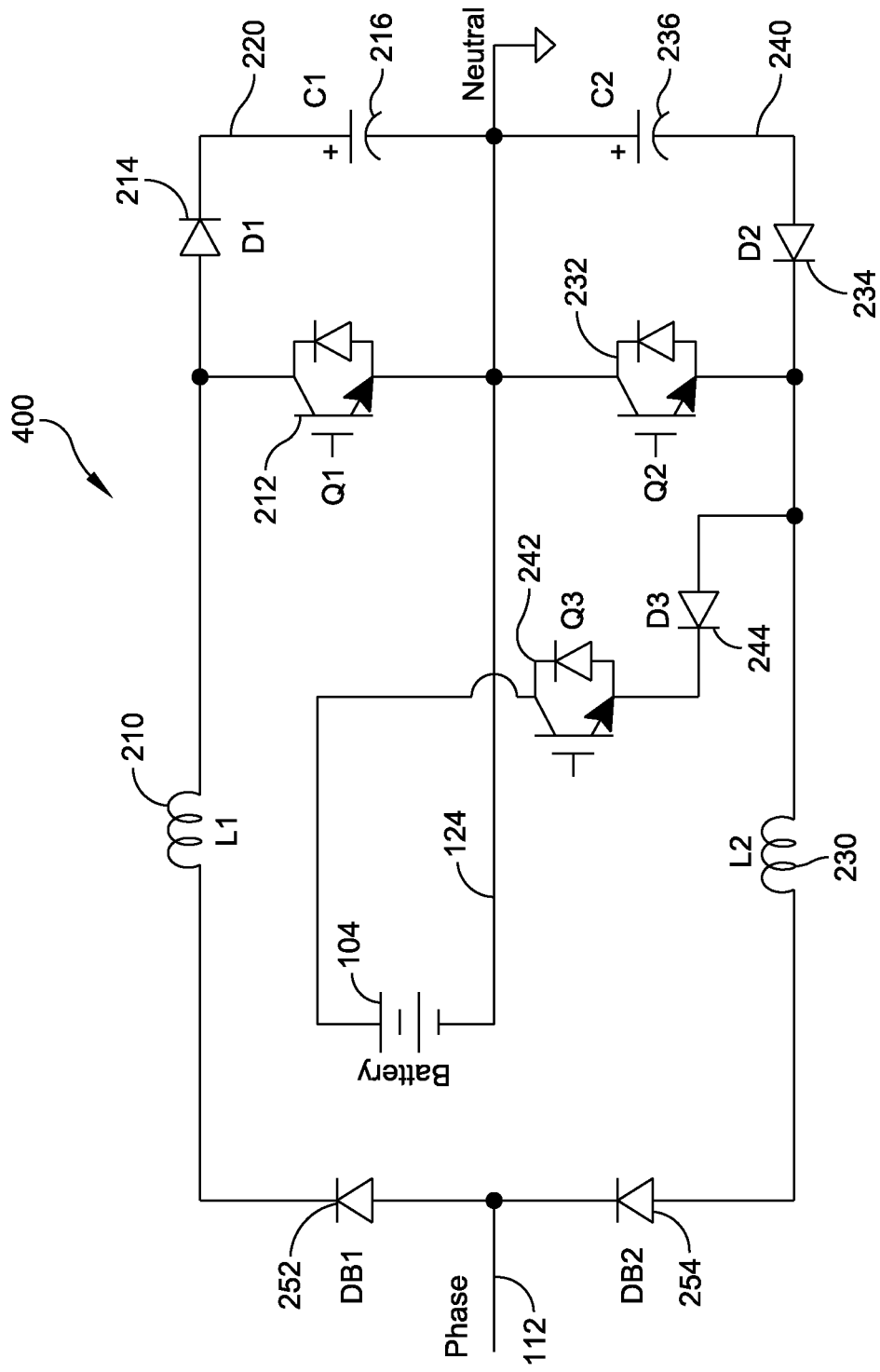
FIGS. 4B and 4C are simplified schematic diagrams showing various modes of operation of the power conversion circuit of FIG. 4A.
Figure 4C:
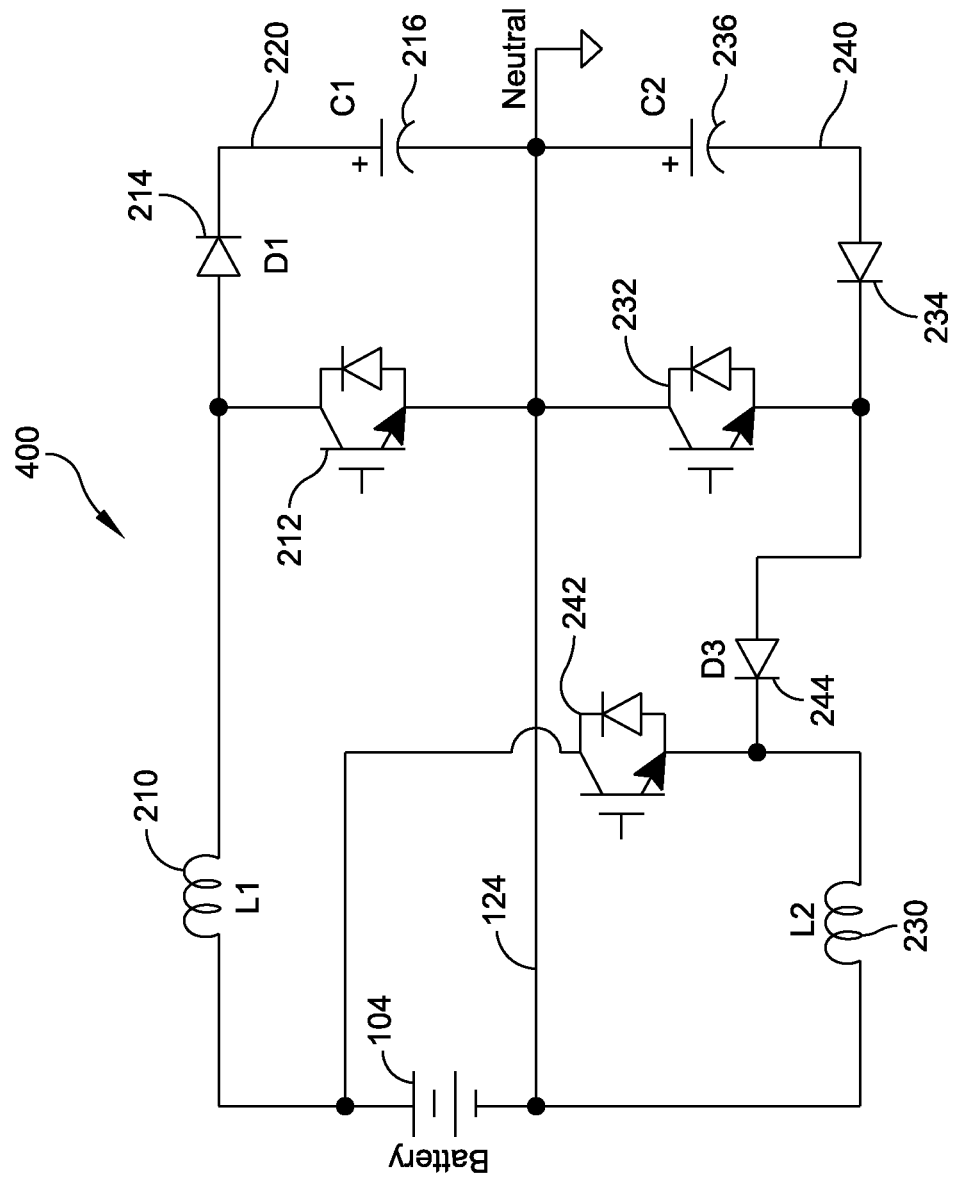

FIGS. 4B and 4C are additional schematic diagrams of the circuit 400 in which certain elements are not shown for simplicity, with FIG. 4B showing the circuit 400 configured in line mode of operation and FIG. 4C showing the circuit 400 configured in backup mode of operation. In FIG. 4B, the circuit 400 is configured to operate in the line mode of operation, in which the first relay 218, the second relay 238, and the third relay 250 (shown in FIG. 4A) are each moved to the respective NO positions. During the positive half-cycle of the AC input, the diode 252, the first relay 218, the first switch 212, the first inductor 210, the first diode 214, and the first capacitor 216 operate as a boost PFC converter. Current through the first inductor 210 is forced to follow the AC input, and the first capacitor 216 may be maintained at, for example, approximately 400V for a 230V line system. During the negative half-cycle of the AC input, the diode 254, the second relay 238, the third relay 250, the second switch 232, the second inductor 230, the second diode 234 and the second capacitor 236 operate as a boost PFC converter. Current through the second capacitor 236 may be maintained at, for example, approximately 400V for a 230V line system. In line mode, the third diode 244 is bypassed by the third relay 250.

In FIG. 4C, the circuit 400 is configured to operate in the backup mode of operation, in which the first relay 218, the second relay 238, and the third relay 250 (shown in FIG. 4A) are each moved to the respective NC positions. With a single battery 104, the positive-side converter operates as a boost converter, including the first inductor 210, the first switch 212, the first diode 214, and the first capacitor 216, which processes power from the battery 104 to the positive DC bus 220. The negative-side converter operates as a buck-boost converter, including the second switch 232, the third switch 242, the second inductor 230, the second diode 234, and the third diode 244, which processes power from the battery 104 to the negative DC bus 240. If the second switch 232 and the third switch 242 are both open (e.g., turned off), the current in the second inductor 230 freewheels to the second capacitor 236, charging the second capacitor 236.

Figure 5:
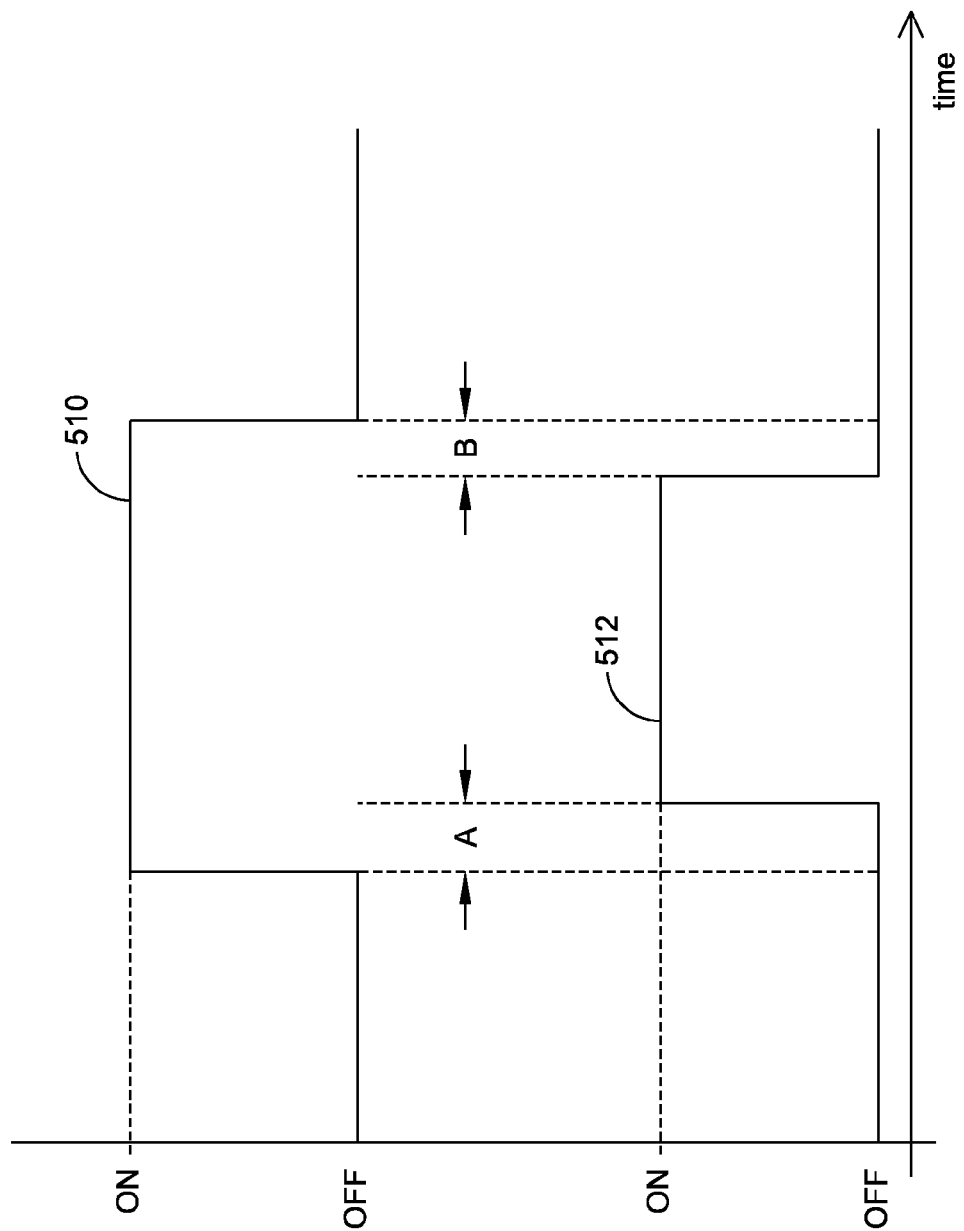
FIG. 5 illustrates various waveforms associated with a power conversion circuit in accordance with another embodiment of the present invention.

For buck-boost operation, the third switch 242 is closed (e.g., turned on) at the beginning of the switching cycle. Prior to closing the third switch 242, the second switch 232 is closed, and the current in the second inductor 230 current freewheels through the seconds switch 232 and the third diode 244, thus turning off the second diode 234 with, for example, approximately 400V across it. The voltage across the third switch 242 is now approximately at battery voltage. After a finite delay (e.g., between approximately 0.5 microseconds and approximately 1.5 microseconds) the third switch 242 is turned on, which applies the remaining voltage across it (e.g., battery voltage) to the third diode 244. One exemplary timing sequence for the second switch 232 and the third switch 242 is shown in FIG. 5, which depicts an on-off sequence 510 of the second switch 232 and an on-off sequence 512 of the third switch 242. A first delay A between turning on the second switch 232 and turning on the third switch 242 may be, for example, between approximately 0.5 microseconds and approximately 1.5 microseconds). A second delay B between turning off the third switch 242 and turning off the second switch 232 may be, for example, between approximately 0.5 microseconds and approximately 1.5 microseconds. It should be understood that in some embodiments the first delay A and the second delay B may be different durations.

Because the second diode 234 is clamped by the antiparallel diode of the second switch 232, voltage across it does not increase beyond the voltage on, for example, the second DC bus 240. A similar principle is applicable when the second switch 232 and the third switch 242 are both turned off. The third switch 242 may be turned off prior to the second switch 232, such as shown in FIG. 5, thus turning off upon reaching battery voltage. After a finite delay (e.g., between approximately 0.5 microseconds and approximately 1.5 microseconds), the second switch 232 is also turned off at DC bus voltage (e.g., approximately 400V).

Figure 6:
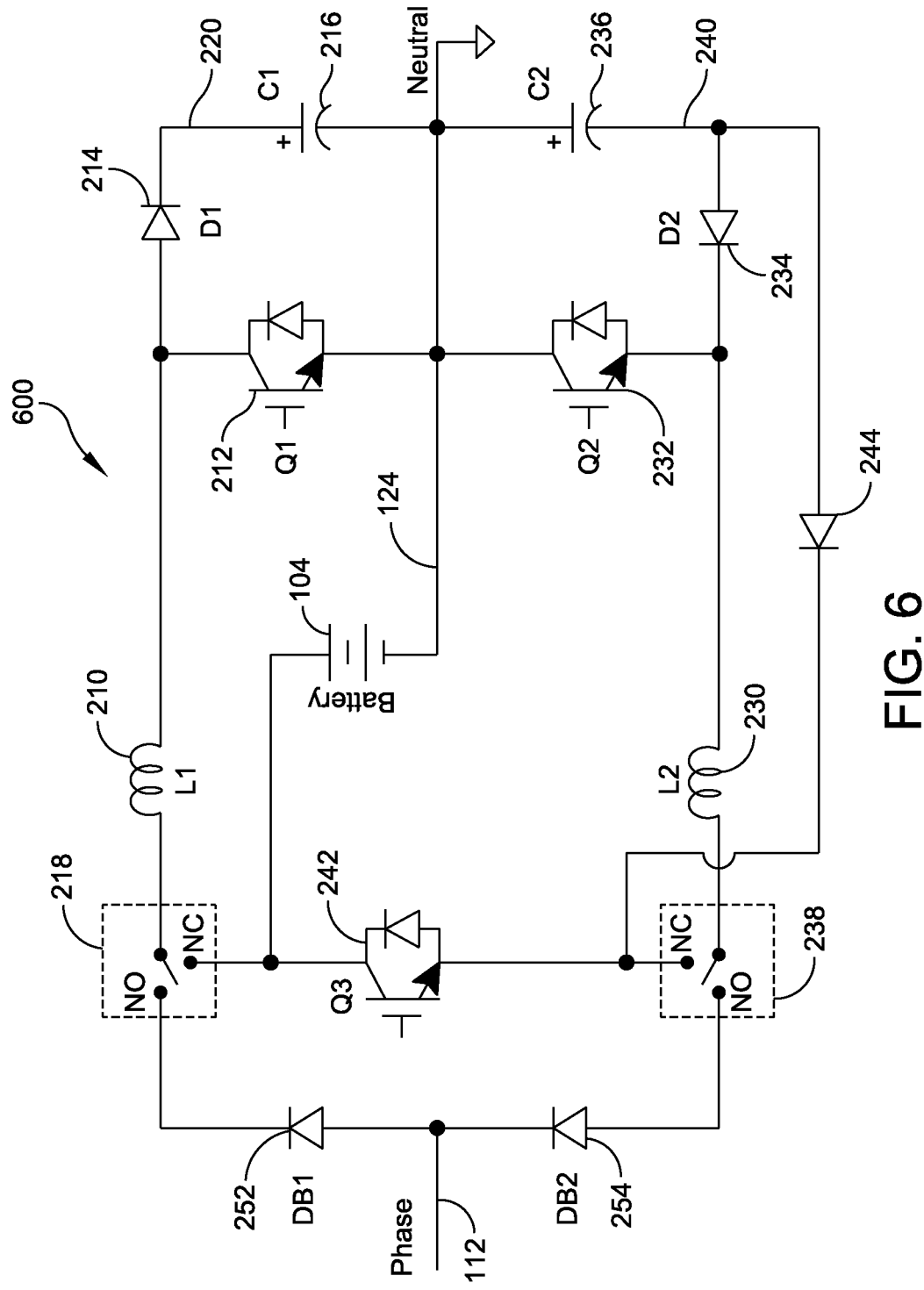
FIG. 6 is a schematic diagram of a power conversion circuit in accordance with yet another embodiment of the present invention.

FIG. 6 shows a schematic diagram of a circuit 600 in accordance with another embodiment of the present invention. The circuit 600 is substantially similar to the circuit 400 shown in FIG. 4A, except that the circuit 600 does not include the third relay 250 (as shown in FIG. 4A), and the third switch 242 is connected between the positive terminal of the battery 104 and the NC contact of the second relay 238. Further, the third diode 244 is connected between the second capacitor 236 and the third switch 242, in parallel with the second diode 234 and the second inductor 230.

The circuit 600 includes a positive-side boost converter and a negative-side boost converter. The positive-side boost converter has a first inductor 210, a first switch 212, a first diode 214, and a first capacitor 216. The positive-side boost converter is switchably coupled to the external power source 102 (e.g., AC mains, not shown) through the phase input 112 and diode 252, or to the battery 104, through a first relay 218. It should be understood that any appropriate switch device may be used in place of the first relay 218 and other relays described herein. The first relay 218 is configured to switch the power feeding the positive-side boost converter between the external power source 102 and the battery 104. The positive-side boost converter is coupled to a first DC bus 220 and the neutral line 124. It should also be understood that a DC bus is not limited to a particular type of conductor and may include any suitable type of conductive element.

The negative-side boost converter has a second inductor 230, a second switch 232, a second diode 234, and a second capacitor 236. As discussed above, the third diode 244 is connected between the second capacitor 236 and the third switch 242, in parallel with the second diode 234 and the second inductor 230. The negative-side boost converter is switchably coupled to the external power source 102 (not shown) through diode 254, or to the third switch 242, through a second relay 238. The second relay 238 is configured to switch the power feeding the negative-side boost converter between the external power source 102, via the phase input 112, and the battery 104, via the third switch 242. The negative-side boost converter is coupled to a second DC bus 240 and the neutral line 124.

In line mode of operation, the first relay 218 and the second relay 238 are each moved to the normally open (NO) position to couple the input AC line voltage at input 112 to inductors 210 and 230, such that positive and negative rectified voltages are respectively provided to inductors 210 and 230. Inductor 210 operates in conjunction with the first switch 212 and diode 214 as the positive-side boost converter, under the control of the controller 130 (not shown) using, for example, pulse width modulation to provide a positive DC voltage across capacitor 216. Similarly, inductor 230 operates in conjunction with the second switch 232 and diode 234 as a negative-side boost converter, also under the control of the controller 130, using, for example, pulse width modulation to provide a negative DC voltage across capacitor 236. The controller may control operation of the boost converters to provide power factor correction at the input of the uninterruptible power supply.

In backup mode of operation, the positive-side boost converter operates as a DC-DC boost converter, and the negative-side boost converter operates as a DC-DC buck-boost converter. Upon a failure of the AC voltage source 102 (not shown), the relays 218 and 238 are moved, under the control of the controller 130, to the normally closed (NC) positions to couple the battery 104 to inductors 210 and 230. The positive-side boost converter operates substantially as discussed above (that is, as a boost converter) using the battery voltage to generate the DC voltage across capacitor 216. To generate the negative voltage across the capacitor 236, a third switch 242, under the control of the controller 130 (not shown) and in conjunction with inductor 230 and diode 234, functions as a buck-boost circuit, with the third switch 242 being cycled off and on. In one example, during each cycle, the second switch 232 can be kept in on, off, or switched modes as a part of the buck-boost circuit in the backup mode of operation.

In another embodiment of the present invention, an alternative circuit is substantially similar to the circuit 400 shown in FIG. 4A, except that the third relay 250 is coupled in parallel with the third diode 244. The third relay 250 is closed in the NO position during the line mode of operation, and open from the NO position in the battery mode of operation. However, unlike the circuit 400, the third relay 250 of the alternative circuit must not be closed in the NO position when switching from the line mode of operation to the battery mode of operation. Prior to switching from the line mode to the battery mode, the third relay 250 must be opened from the NO position and checked to ensure that it is not welded in the NO position. If the third relay 250 is closed in the NO position, the alternative circuit cannot operate in the battery mode because the battery 104 will be shorted through the third switch 242 when the third switch is closed, through third relay 250, and through the anti-parallel diode of the second switch 232. If the battery 104 is shorted in this manner, damage or failure of the components could result.

Embodiments of the present invention provide several advantages over prior solutions. For example, one advantage of the embodiment shown in FIG. 4A is that the second diode 234 and the third diode 244 may each be relatively low-voltage (e.g., approximately 600V), which, among other things, enables the second switch 232 and the third switch 242 to switch more quickly than would be practicable if the second and third diodes have higher voltage ratings (as a result of lower reverse recovery losses), thus reducing switching losses and improving efficiency. Another advantage is that a failure of the third relay 250 does not cause a catastrophic failure of the UPS. For example, if the third switch 242 fails in the NO position during line mode of operation, then line mode of operation is not affected. Similarly, if the third switch 242 fails in the NC position during backup mode of operation, then backup mode of operation is not affected, and line mode of operation can still be achieved with current passing through the third diode 244, as is the case in the circuit of FIG. 3.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In the embodiments described above, rectifier/boost circuits are described for use with uninterruptible power supplies, although it should be appreciated that the circuits described herein may be used with other types of power supplies.

Embodiments of the present invention may be used with uninterruptible power sources having a variety of input and output voltages and may be used in single phase or multiphase uninterruptible power supplies.

Having thus described several aspects of at least one embodiment of this invention, it is to be appreciated various alterations, modifications, and improvements will readily occur to those skilled in the art. Such alterations, modifications, and improvements are intended to be part of this dis- closure, and are intended to be within the spirit and scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. A power converter, comprising:
a first power input to receive AC input power;
a second power input to receive backup power;
a first DC bus configured to provide a positive DC output voltage;
a second DC bus configured to provide a negative DC output voltage; and
a power conversion circuit switchably coupled to the first power input and the second power input, the power conversion circuit operable to generate the positive and negative DC output voltages and configured such that, in a backup mode of operation, the negative DC output voltage is generated using the backup power through a first current path of the power conversion circuit that includes a first diode coupled between the second power input and the second DC bus, and, in a line mode of operation, the negative DC output voltage is generated using the AC input power through a second current path of the power conversion circuit that bypasses the first diode and includes a second diode coupled between the first power input and the second DC bus.

2. The power converter of claim 1, wherein the first diode has a first cathode and a first anode, wherein the second diode has a second cathode, wherein the power conversion circuit includes an inductive element and a switch having a pole, a first contact and a second contact, the pole being coupled to the inductive element, the first contact being coupled to the first cathode of the first diode, the second contact being coupled to the first anode of the first diode and the second cathode of the second diode, the switch being configured to form a portion of the first current path when the first contact is closed and a portion of the second current path when the second contact is closed.

3. The power converter of claim 1, wherein the first diode is rated at approximately 600V, and wherein the second diode is rated at approximately 600V.

4. The power converter of claim 1, wherein the second diode includes a second anode coupled to the second DC bus.

5. The power converter of claim 1, wherein the second power input is coupled to a battery.

6. The power converter of claim 5, wherein the battery includes a negative terminal, and wherein the power converter further comprises a connection circuit configured to switchably couple the inductive element to one of the first power input and the negative terminal of the battery.

7. The power converter of claim 6, wherein the inductive element is coupled in series between the connection circuit and the second diode.

8. The power converter of claim 1, wherein the first diode is coupled in parallel with the second diode.

9. The power converter of claim 1, wherein the power conversion circuit is configured to be switchable between a first configuration and a second configuration, and wherein the first configuration of the power conversion circuit includes a boost converter circuit and the second configuration of the power conversion circuit includes a buck-boost converter circuit.

10. A method of providing power to a load, the method comprising:
detecting a loss of input power from a primary power source;
responsive to detecting the loss of the input power, generating, in a backup mode of operation, a negative DC output voltage using a backup power source through a first current path that includes a first diode coupled between the backup power source and a DC power bus;
detecting a presence of the input power from the primary power source; and
responsive to detecting the presence of the input power, generating, in a line mode of operation, the negative DC output voltage using the primary power source through a second current path that bypasses the first diode and includes a second diode coupled between the primary power source and the DC power bus.

11. The method of claim 10, further comprising coupling, in the backup mode of operation, a first cathode of the first diode to an inductive element using a switch to create a portion of the first current path including the first diode, the second diode, and the inductive element such that the first diode is coupled in series between the inductive element and the second diode.

12. The method of claim 11, further comprising decoupling, in the line mode of operation, the first cathode of the first diode from the inductive element using the switch and coupling a second cathode of the second diode to the inductive element using the switch to create a portion of the second current path that bypasses the first diode and includes the second diode and the inductive element.

13. The method of claim 12, wherein a first switching element is coupled in series between the first cathode of the first diode and a battery, wherein a second switching element is coupled to a first anode of the first diode and the second cathode of the second diode, and wherein the method further comprises energizing the first switching element a first amount of time subsequent to energizing the second switching element.

14. The method of claim 13, wherein the first amount of time is between approximately 0.5 microseconds and approximately 1.5 microseconds.

15. The method of claim 13, further comprising deenergizing the first switching element a second amount of time prior to deenergizing the second switching element.

16. The method of claim 15, wherein the second amount of time is between approximately 0.5 microseconds and approximately 1.5 microseconds.

17. A power converter, comprising:
a first power input to receive AC input power;
a second power input to receive backup power;
a power output to provide output power derived from at least one of the AC input power and the backup power;
a first diode and a second diode; and
means for providing a negative DC output voltage to the power output through the first diode and the second diode using the backup power in a backup mode of operation, and providing the negative DC output voltage to the power output through the second diode using the AC input power in a line mode of operation.

18. The power converter of claim 17, wherein the first diode and the second diode are each coupled between the second power input and the power output in the backup mode of operation, and wherein the second diode is coupled between the first power input and the power output in the line mode of operation.

19. The power converter of claim 17, wherein the first diode is bypassed in the line mode of operation.

20. The power converter of claim 17, wherein the power converter is configured to be switchable between a first configuration and a second configuration, and wherein the first configuration includes a boost converter circuit and the second configuration includes a buck-boost converter circuit.

* * * * *